No. 712,258. Patented Oct. 28, 1902.
A. G. CAMPBELL.
DRIER FOR ORES, &c.
(Application filed Apr. 7, 1902.)
(No Model.) 2 Sheets—Sheet 1.

Witnesses:
Fred S. Greenleaf.
W. C. Lunsford.

Inventor.
Alfred G. Campbell,
by Crosby Gregory
Attys.

THE NORRIS PETERS CO., PHOTO-LITHO., WASHINGTON, D. C.

No. 712,258. Patented Oct. 28, 1902.
A. G. CAMPBELL.
DRIER FOR ORES, &c.
(Application filed Apr. 7, 1902.)
(No Model.) 2 Sheets—Sheet 2.
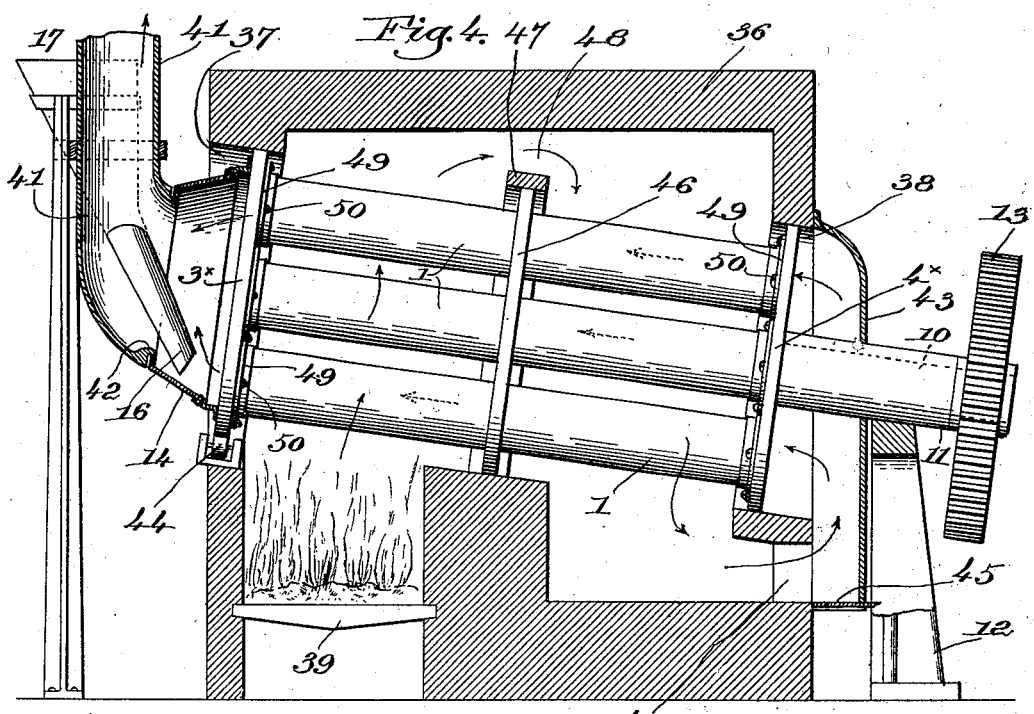
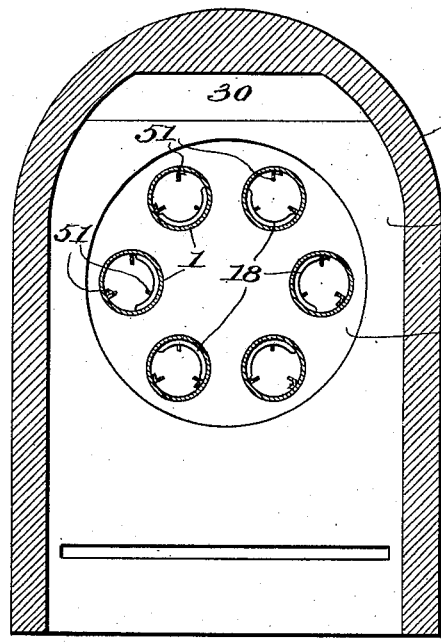
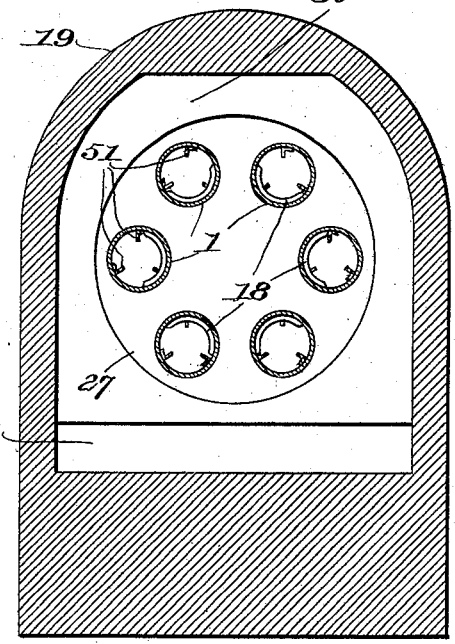
Witnesses.
Thomas J. Drummond
Herman J. Sartoris
Inventor.
Alfred G. Campbell,
by Crosby & Gregory
attys.

UNITED STATES PATENT OFFICE.

ALFRED G. CAMPBELL, OF SHERBROOKE, CANADA.

DRIER FOR ORES, &c.

SPECIFICATION forming part of Letters Patent No. 712,258, dated October 28, 1902.

Application filed April 7, 1902. Serial No. 101,610. (No model.)

*To all whom it may concern:*

Be it known that I, ALFRED G. CAMPBELL, a subject of the King of Great Britain, and a resident of Sherbrooke, Province of Quebec, Dominion of Canada, have invented an Improvement in Driers for Ores, &c., of which the following description, in connection with the accompanying drawings, is a specification, like numerals on the drawings representing like parts.

This invention relates to apparatus for drying ore or other similar material; and it has for its object the production of a novel and very efficient drying mechanism whereby the ore or other material to be treated can be fed in continuously at one end of the apparatus and gradually passed through and agitated in a series of drying-compartments and finally discharged, the structure of the apparatus being such that ordinarily and preferably the material to be dried is not brought into direct contact with the gas, hot air, or other heating medium.

The various novel features of my invention will be hereinafter described, and particularly pointed out in the following claims.

Figure 1:
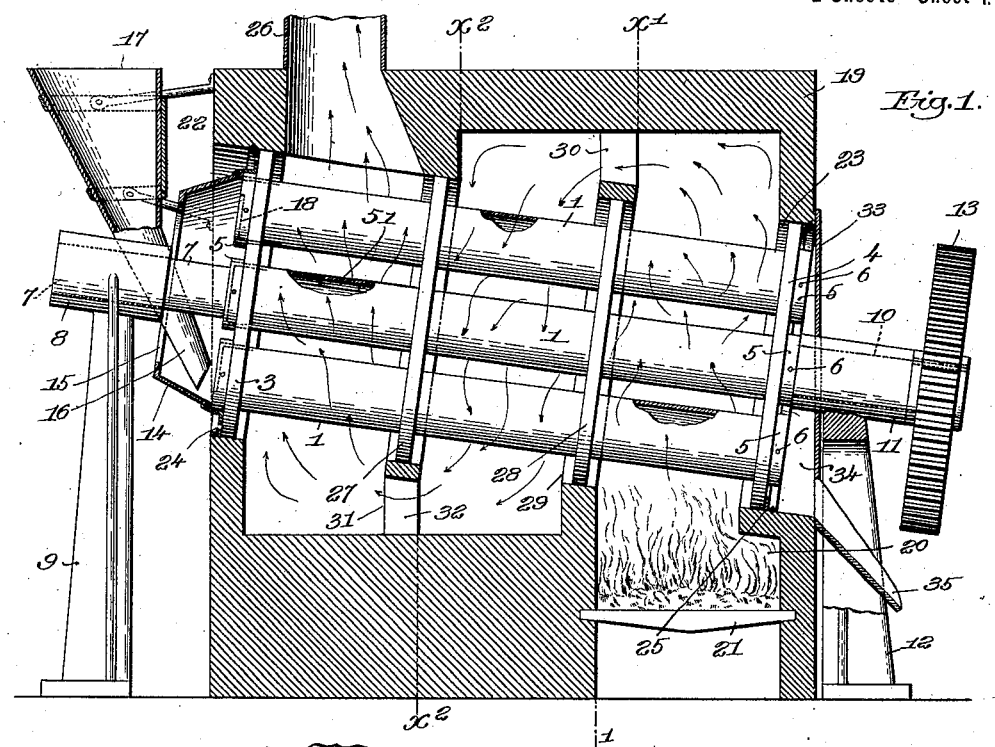
Figure 2:
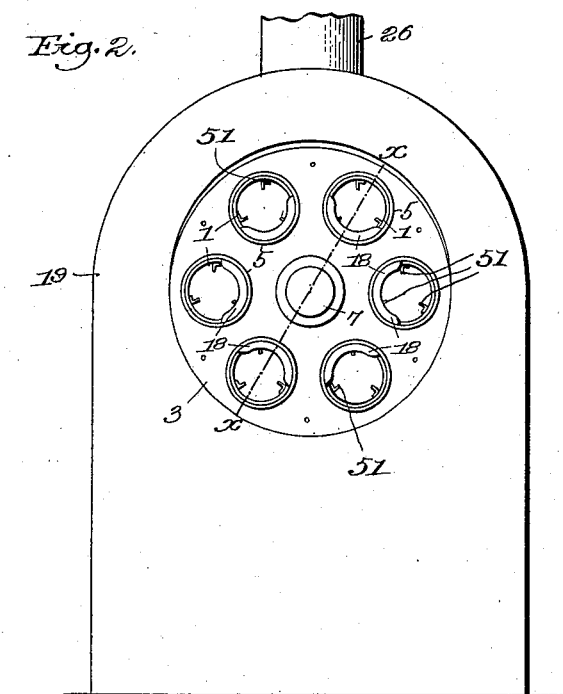
Figure 3:
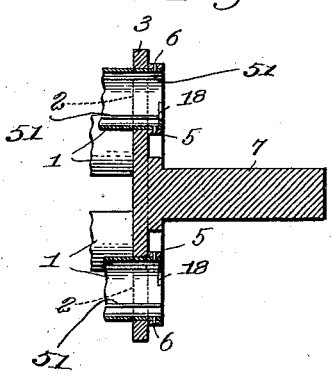

Figure 1 is a longitudinal vertical section of a drying apparatus embodying one form of my invention, the rotatable drier being shown, however, in elevation. Fig. 2 is a left-hand end view of the apparatus shown in Fig. 1, but with the inlet or feed-hood and feed-hopper omitted. Fig. 3 is a diametral sectional detail on the line $x\,x$, Fig. 2, to be referred to. Fig. 4 is a view similar to Fig. 1, but showing a modified arrangement whereby the heating medium can be made to traverse the interior of the drying-compartments, as well as to act upon the exterior thereof. Fig. 5 is a transverse vertical section on the line $x'\,x'$, Fig. 1; and Fig. 6 is a similar view on the line $x^2\,x^2$, Fig. 1, both looking toward the left viewing Fig. 1.

I have herein shown the drier as comprising a plurality of longitudinal imperforate compartments 1, preferably made of sheet metal, or they may be cast, if desired, and they are shown as open-ended cylinders of suitable length arranged in parallelism with each other and axially to a common longitudinal center of rotation, the opposite open ends of the cylinders being extended through apertures 2 in like circular heads 3 4, and the heads are herein shown as provided, preferably on their outer faces, with annular flanges 5, (see Fig. 3,) surrounding the openings and the cylinders 1 or secured to the said flanges in any suitable manner, as by rivets 6. The heads are preferably made as castings, and they serve to rigidly connect the group of cylinders, and they also in the present instance of my invention assist in supporting the cylinders to be rotated bodily about their common axis. To this end the head 3 has secured to or forming part of it a gudgeon 7, rotatably mounted in a bearing 8 on a suitable standard 9, while the head 4 is provided with a gudgeon 10, rotatably mounted in a bearing 11 on a standard 12, as shown in Fig. 1, and I have shown in said figure the gudgeon 10 as provided with a gear 13, to be connected in any suitable manner with means (not herein shown) for rotating the connected cylinders.

The structure thus described obviates the extension of a shaft from one to the other end of the rotating portion of the apparatus and obviates numerous difficulties which arise from such a continuous shaft.

The gudgeons 7 and 10 constitute a common axis, about which the cylinders as a group are rotated, and, referring to Fig. 1, it will be noted that such axis is inclined in the direction of its length, so that the open upper ends of the cylinders 1 are higher than the opposite ends thereof.

A hood 14 is shown in Fig. 1 as secured to the head 3 on the outer side thereof, said hood having an opening 15 in its outer end surrounding the gudgeon and receiving through it the spout 16 of a suitable feed-hopper 17, through which the material to be treated by the drier is fed to the hood, the material dropping onto the lower portion of the hood and entering the cylinders one after another as they travel through the lower portion of their circular path of movement. The inclination of the cylinders in the direction of their length causes the material to travel by gravity from the upper to the lower ends of the cylinders, and the bodily rotation of the latter operates to thoroughly agitate and turn over the material in its passage, so as to be thoroughly exposed to the action of the heating medium before the material is finally discharged through the open lower ends of the cylinders. In order to prevent the material from dropping or being thrown out of the upper ends of said cylinders after passing thereinto, I prefer to provide the same with retaining devices, herein shown as segmental lips 18, (see Fig. 2,) inside and at the upper ends of the cylinders, the lips being on that portion of the circumference of a cylinder nearer the center of rotation. This is clearly shown in Fig. 2, and it will be seen that when a cylinder is in the lower part of its path of movement the material to be treated can freely enter from the hood 14, while as the cylinder rises and gets to the highest point of its circular path the lip will be thrown into position to guard against any throwing out of the material. With a considerable inclination the lips would not be necessary; but in an apparatus designed to treat the material while the latter is given a very slow speed through the cylinders the lips will prove of value.

A heating-chamber 19, which may be built of brick or other suitable material, is shown in Fig. 1 as provided with a combustion-chamber 20 and a suitable grate 21 for the fire, and said heating-chamber is provided at its opposite ends with circular openings 22 23, in which the heads 3 and 4, respectively, rotate, the diameter of the openings being just sufficient to permit the free rotative movement of the heads, while the latter substantially close the openings. To increase the effectiveness of such closing of the openings, the latter are shown as provided with annular flanges 24 25, secured to the wall of the opening and against or closely adjacent the outer faces of the heads. An outlet or escape flue 26 is shown in Fig. 1, located at the end of the chamber opposite the grate 21, so that the products of combustion will traverse the length of the heating-chamber, passing about and in contact with the exterior of the various cylinders during their rotation and thoroughly heating the contents without coming into direct contact with the latter.

It is desirable to make the path of the heating medium irregular or tortuous in order that the heat may be more thoroughly utilized, and to this end I have shown intermediate heads, as 27 28, secured to the cylinders, the head 28 rotating within a circular opening in a wing-wall 29, said wall having an opening 30 above the group of cylinders, while the intermediate head 27 rotates within a circular opening of a second wing or baffle wall 31, the latter having a transverse opening 32 below the group of cylinders, said walls 29 and 31 being shown in Figs. 5 and 6, respectively. The intermediate heads 27 and 28 do not absolutely close the irregular openings in said walls, but they substantially close them, so that the heating medium must pass upward and around the cylinders between the head 4 and the intermediate head 28 and thence through the opening 30 in the baffle-wall of the heating-chamber and down between the intermediate heads 27 and 28 through the opening 32 in the baffle-wall 31. Thence the heating medium passes upward and out through the escape flue or chimney 26, the course of the gases or products of combustion being shown by arrows. The supports for the group of cylinders are entirely external to the heating-chamber, as will be manifest from Fig. 1, and a guard or cover plate 33 is placed against the outer wall of the heating-chamber adjacent the delivery or discharge ends of the cylinders to form a compartment, as 34, provided with a discharge-spout 35. The material after traversing the cylinders is delivered into the compartment 34 and thence discharged through the spout or chute 35 into any suitable receptacle. Even though the heating-chamber 19 is not provided with baffle-walls, such as herein described, the intermediate heads will greatly assist in retarding and distributing the heating medium as it passes about the drying-cylinders, and the baffle-walls may be varied in shape and construction from that herein shown and described.

It is sometimes desirable in treating certain kinds of material to permit the heating medium to come into direct contact therewith, and this may be readily arranged by a slight modification of my drying apparatus without any material change in the essential features thereof.

Referring to Fig. 4, I have shown the heating-chamber 36 as provided at its opposite ends with circular openings 37 and 38, as before, to receive and be substantially closed by the heads $3^\times$ and $4^\times$, connecting the drying-cylinders 1 and the hood 14. Feed-spout 16 and hopper 17 are substantially as shown in Fig. 1. In the apparatus illustrated in Fig. 4, however, the products of combustion which constitute the heating and drying medium for the ore pass up around the exterior of the cylinders 1, at the inlet ends thereof, and thence to the opposite end of the chamber 36, the end wall having an opening 40 therein near its bottom. This opening communicates with the lower end of a stationary hood or compartment 43, which incloses the lower or discharge ends of the material, the ore or other material being discharged into the bottom of said compartment 43, from which the material can be withdrawn through an opening provided with a slide 45. This slide may be left open, if desired, as the intake of outside material would not make any material difference. The heating and drying medium passes from the compartment 43 into the lower ends of the cylinders and traverses them to their upper inlet ends and thence into the hood 14. An outlet-flue 41 is shown as enlarged or bell-shaped to coöperate with the circular opening of the hood 14, an annular flange 42 on the flue entering the opening of the hood and forming a coupling or joint therewith, the vapor and other gaseous matter passing from the hood 14 through the flue 41 to the chimney or escape-pipe. (Not shown.) The feed-spout 16 is shown as passed through the flue into the hood 14. An intermediate head, as 46, is shown in Fig. 4, rotating in a circular opening in a transverse wing or baffle wall 47 of the chamber 36, so that the products of combustion pass from the grate 39 up and over the cylinders, through the opening 48 at the top of the wall, and down to the opening 40, and thence to the compartment 43. The full-line arrows show the direction of the heating medium as it passes around the cylinders 1, and the dotted arrows show its passage through the cylinders. In Fig. 4 the lower head $4^\times$ is shown as provided with a gudgeon 10, as in Fig. 1, mounted in a bearing 11 on a standard 12, and a gear 13 is affixed to the gudgeon, but the head $3^\times$ is shown as mounted on bearing-rolls, one of which, as 44, is shown mounted in the opening 37. This mode of mounting is not of itself novel, as it is now used in apparatus of a type similar to mine.

By arranging the apparatus, as shown in Fig. 4, so that the drying medium passes from the discharge to the inlet ends of the cylinders the moisture from the ore is carried along and discharged into the hood 14.

In Fig. 4 the cylinders are shown as having flanges 49 at their ends, the flanges being attached to the heads $3^\times$ and $4^\times$ by bolts, rivets, or screws, as 50.

In order that the ore or other material shall be thoroughly agitated and turned over as it travels along the cylinders, so as to expose it to the best advantage to the action of the drying medium, longitudinal ribs or ledges are secured to the inner walls of the cylinders, and, referring to Figs. 1 to 3 and Figs. 5 and 6, angle-irons 51 are shown secured in any suitable manner to the cylinders. As the latter turn, the angle-irons carry the ore up and drop it, breaking up and opening out the material and causing it to be dried more evenly and thoroughly. It is to be understood that the cylinders will be thus equipped in the apparatus shown in Fig. 4.

The apparatus herein shown and described is very strong and durable, it has large capacity relative to its size, and is highly efficient in its operation.

The length of time for which the material is subjected to the heating medium depends upon the speed of rotation of the drier-cylinders, the angle at which they are inclined in the direction of their length, and also upon the character and condition of the material itself.

It is well known by those skilled in the art that rotary driers are supported in various ways, either by a longitudinal axis or by rollers or other supports on which the ends of the rotating portion travels, and such modes of support or combinations thereof may be employed to support the group of cylinders instead of the means herein shown.

Various changes and modifications may be made in the apparatus without departing from the spirit and scope of my invention, one practical embodiment of which has been hereinbefore described and clearly illustrated in the drawings.

Having fully described my invention, what I claim as new, and desire to secure by Letters Patent, is—

1. In a mechanical drying apparatus, a plurality of imperforate, open-ended cylinders, circular heads having apertures to receive the cylinders, the latter being axially arranged about a common longitudinal center, a heating-chamber in which the cylinders are inclosed, said chamber having circular openings to receive the said heads, the latter substantially closing the said openings, means to direct a heating medium to the exterior of the cylinders, and means located exteriorly to the heating-chamber to rotatably support the group of cylinders.

2. In a mechanical drying apparatus, a plurality of elongated, imperforate and open-ended cylinders, circular heads through which the ends of said cylinders are extended and to which they are rigidly secured, the cylinders being axially arranged about a common longitudinal center, means to rotatably support the group of cylinders in an inclined position, a heating-chamber inclosing the cylinders between the heads and having openings substantially closed by said heads, means to introduce material to be treated to the upper, inlet ends of the cylinders, and a discharge-compartment with which the lower, outlet ends of the cylinders communicate.

3. In a mechanical drying apparatus, a plurality of imperforate, open-ended cylinders, parallel circular heads through which the opposite ends of the cylinders extend and to which they are secured, gudgeons centrally secured to the heads, bearings for said gudgeons, to rotatably support the group of cylinders, a heating-chamber inclosing the latter between the heads and having circular openings to receive and be substantially closed by the heads, and means external to the chamber to introduce the material to be treated to the open inlet ends of the cylinders.

4. In a mechanical drying apparatus, a plurality of imperforate, open-ended cylinders, parallel circular heads through which the opposite ends of the cylinders extend and to which they are secured, a heating-chamber inclosing the cylinders between the heads, said chamber having circular openings to receive and be substantially closed by said heads, means external to the heating-chamber to rotatably support the group of cylinders, and one or more circular baffle-plates through which the cylinders are extended and to which they are secured, said plate or plates being located between the heads and within the heating-chamber, and serving to impede the direct course of the heating medium about the cylinders.

5. In a mechanical drying apparatus, two parallel, circular heads having a series of axially-arranged openings and annular flanges surrounding said openings, a plurality of open-ended, imperforate cylinders extended through the openings in the heads and secured to the flanges thereon, a heating-chamber inclosing the cylinders between the heads and having circular openings to receive and be substantially closed by said heads, the open ends of the cylinders being accessible from outside the chamber, and means external to said chamber to rotatably support the group of cylinders rigidly connected by the heads.

6. In a mechanical drying apparatus, a series of parallel circular heads each having a series of axially-arranged openings, a corresponding series of open-ended, imperforate cylinders extended through the openings in the several heads and rigidly secured to the latter, a heating-chamber to inclose the cylinders and having circular end openings to receive and be substantially closed by the two endmost heads, segmental division-walls within the chamber, to coöperate with the intermediate heads and form therewith a tortuous path through said chamber for the passage of the heating medium, and means to rotatably support the connected cylinders.

7. In a mechanical drying apparatus, a group of elongated, imperforate and open-ended compartments to receive the material to be treated, means to rigidly connect the same in parallelism about a common inclined longitudinal axis of rotation, means to rotatably support the group of compartments, a heating-chamber inclosing them and constructed to direct a heating medium upon and about the exterior of the compartments, to heat and dry their contents, a feed-hood in communication with the open, upper ends of the compartments, to feed material thereto, and means to prevent the material from being thrown out as the compartments are bodily rotated about their common axis.

8. In a mechanical drying apparatus, a series of imperforate, open-ended cylinders arranged in parallelism about a common inclined longitudinal axis of rotation, circular heads having openings to receive the ends of the cylinders and to which they are secured, a heating-chamber inclosing the cylinders and having end openings closed by the heads, means to rotatably support the group of cylinders, a feed device to deliver the material to be treated to the inlet end of each cylinder at or about the lowest portion of its circular path of movement, and a segmental retaining-lip on the inlet end of each cylinder.

9. In a mechanical drying apparatus, a series of imperforate, open-ended cylinders arranged in parallelism about a common inclined longitudinal axis of rotation, circular heads having openings to receive the ends of the cylinders and to which they are secured, a heating-chamber inclosing the cylinders and having end openings closed by the heads, means to rotatably support the group of cylinders, a feed-hood inclosing the open inlet ends of the cylinders, to direct thereinto the material to be treated, and an inturned segmental retaining-lip at the inlet end of each cylinder, the said lips being located on the portion of the circumference of a cylinder nearer the common axis of rotation.

10. In a mechanical drying apparatus, a plurality of imperforate open-ended cylinders, circular heads having apertures through which the ends of the cylinders are extended, and to which they are secured, means to rotatably support the group of cylinders, the latter being arranged in parallelism and axially relative to a common center of rotation, a heating-chamber surrounding the cylinders, and having circular end openings to receive and be substantially closed by the head, and baffles within the heating-chamber, said baffles comprising fixed and coöperating movable members, to impart a tortuous or indirect course to the heating medium in the passage of the same about the cylinders.

In testimony whereof I have signed my name to this specification in the presence of two subscribing witnesses.

ALFRED G. CAMPBELL.

Witnesses:
DOUGLAS ODELL,
PAUL HAMMERIEL.